US006786532B2

United States Patent
McNally

(10) Patent No.: US 6,786,532 B2
(45) Date of Patent: Sep. 7, 2004

(54) TRUCK BODY HINGE ASSEMBLY

(76) Inventor: Eric Christopher McNally, 8090 Little Circle Rd., Noblesville, IN (US) 46060

( * ) Notice: Subject to any disclaimer, the term of this patent is extended or adjusted under 35 U.S.C. 154(b) by 0 days.

(21) Appl. No.: 10/608,929

(22) Filed: Jun. 27, 2003

(65) Prior Publication Data
US 2004/0056499 A1 Mar. 25, 2004

Related U.S. Application Data
(60) Provisional application No. 60/392,883, filed on Jul. 1, 2002.

(51) Int. Cl.[7] .............................. E05D 7/10; B60R 11/06
(52) U.S. Cl. ..................................... 296/146.11; 16/229
(58) Field of Search .......................... 296/37.6, 146.11, 296/202; 16/229, 230, 231, 262, 268; 49/398, 400

(56) References Cited

U.S. PATENT DOCUMENTS

| | | | | |
|---|---|---|---|---|
| 1,166,926 A | * | 1/1916 | O'Neill ..................... 180/69.2 |
| 2,455,417 A | * | 12/1948 | Holan et al. ............... 296/37.6 |
| 2,504,222 A | * | 4/1950 | Otto ......................... 296/24.45 |
| 2,530,578 A | * | 11/1950 | Hotop ....................... 296/24.32 |
| 4,370,829 A | * | 2/1983 | Wagner ........................ 49/388 |
| 4,955,659 A | * | 9/1990 | Kosugi ..................... 296/146.8 |
| 5,000,502 A | * | 3/1991 | Lyall ........................ 296/186.4 |
| 5,259,091 A | * | 11/1993 | Mordick ....................... 16/262 |
| 5,267,773 A | * | 12/1993 | Kalis et al. .............. 296/183.1 |
| 5,421,645 A | * | 6/1995 | Young ......................... 312/108 |
| 5,839,775 A | * | 11/1998 | Young et al. ............ 296/182.1 |
| 6,089,639 A | * | 7/2000 | Wojnowski ................ 296/37.6 |
| 6,099,070 A | * | 8/2000 | Yocum ..................... 296/182.1 |
| 6,131,981 A | * | 10/2000 | Finley ....................... 296/37.6 |
| 6,139,081 A | * | 10/2000 | Lemieux ................... 296/37.7 |

FOREIGN PATENT DOCUMENTS
EP     314616 A1 * 5/1989 ................. 16/262

\* cited by examiner

Primary Examiner—D. Glenn Dayoan
Assistant Examiner—Paul Chenevert
(74) Attorney, Agent, or Firm—McDonnell, Boehnen, Hulbert & Berghoff LLP

(57) ABSTRACT

A hinge assembly for truck utility bodies. The hinge assembly comprising three female hinges, a male hinge, and a hinge pin aligned along the pivot axis of door of the truck utility body. The hinge assembly is mounted inside the utility body of the truck, thereby eliminating the problems associated with externally mounted hinge assemblies.

26 Claims, 5 Drawing Sheets

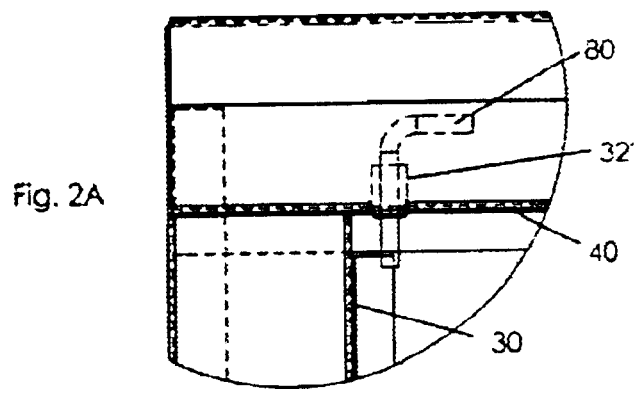
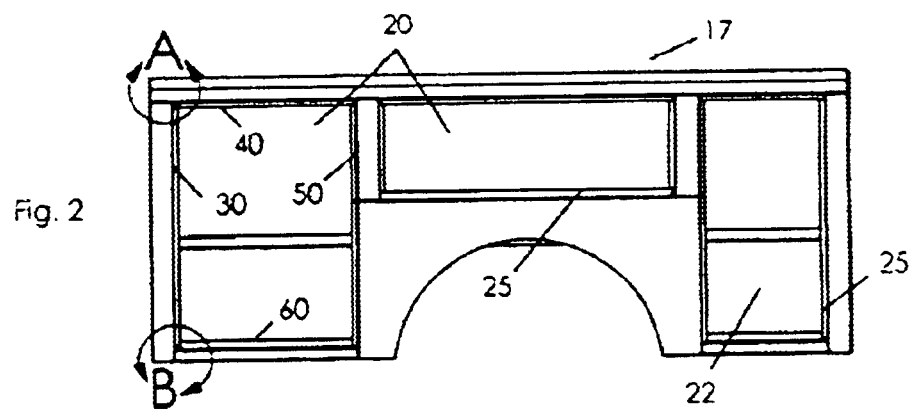
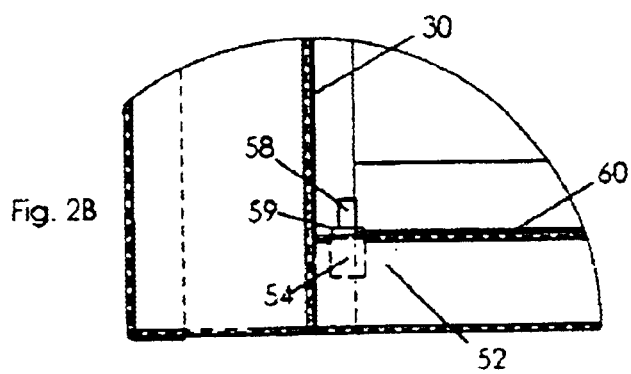

TRUCK BODY HINGE ASSEMBLY

FIELD OF THE INVENTION

This application claims priority to Provisional Patent Application Serial No. 60/392,883 filed Jul. 1, 2002.

BACKGROUND

Utility truck bodies are commonly used in construction and utilities vehicles, as well as in fire and rescue vehicles. These utility bodies have storage compartments integrated within the body of the truck that are accessible through doors located on the outside of the truck body.

Currently, there are three primary styles of hinge assemblies used to mount the access doors to the utility truck body. The first style is a "bolt-on" hinge. With this style, the access door is mounted onto the outside of the body using a rod running the full length of the door. The rod is fitted into two hinge brackets bolted onto the outside of the body, above and below the door. Thus the rod is permitted to spin in the hinge brackets to open and shut the door. While the "bolt-on" hinge is easy to install, it poses several disadvantages because it is mounted on the outside of the utility body. For example, since the hinge is constantly exposed to the outside elements, dirt and road grime can easily penetrate into the hinge brackets causing wear on the hinge. Additionally, since the "bolt-on" hinges fit to the outside of the body, they have little security because they can break off easily and are easily pried open with a screwdriver or crowbar.

The second style of hinge is a piano hinge. While a portion of the piano hinge is mounted within the storage compartment, the hinge itself is exposed to the outside of the utility body. Therefore, the piano hinges are susceptible to the same problems caused by exposure to the elements. Additionally, security is also an issue with the piano hinge because thieves can easily remove it.

The third style of hinge is the "wrecker-style" hinge. This hinge is composed of two main parts. First a C-shaped bracket is mounted inside the storage compartment of the utility body. A hole is drilled through the top and bottom portions of the bracket. Second, a bar is attached to the bracket using a bolt running through the top portion of the bracket, the bar, and the bottom portion of the bracket. This allows the bar to swing around the bolt. The opposite end of the bar is then welded or fastened onto the inside of the door. Thus the bar is usually shaped oddly in order to fit around the door jam and attach to the inside of the door. Although the "wrecker-style" hinge is mounted inside the body, it is cumbersome and significantly reduces the storage compartment space when the door is shut. These hinges are also difficult and expensive to install.

Therefore, a need exists for a hinge assembly for use with utility truck bodies that is mounted inside the body but does not occupy internal compartment space and is easy to install.

SUMMARY OF THE INVENTION

In one aspect, this invention includes a door hinge assembly comprising a door frame assembly having a first side, a second side, a third side, and a fourth side, wherein the first side is positioned opposite the third side, the second side is connected to the first side and the third side, and the fourth side is positioned opposite the second side and connected to the first side and the third side; a first female hinge, a second female hinge, and a third female hinge, each comprising a hollow mounting block having an opening at the top and bottom of the mounting block; a male hinge comprising a mounting block having a top end and a bottom end and a pivot rod extending out of the top end of the mounting block, an access door having a pivot axis, and a hinge pin, wherein the first female hinge is mounted within the second side of the door frame assembly, the second female hinge and third female hinge are mounted along the pivot axis of the access door, and the male hinge is mounted within the fourth side of the door frame assembly.

In another aspect, this invention includes an access door and frame assembly, comprising a door frame assembly having a first side, a second side, a third side, and a fourth side, wherein the first side is positioned opposite the third side, the second side is connected to the first side and the third side, and the fourth side is positioned opposite the second side and connected to the first side and the third side; an access door having a pivot axis; a first female hinge, a second female hinge, and a third female hinge, each comprising a hollow mounting block having an opening at the top and bottom of the mounting block, wherein the first female hinge is mounted within the second side of the door frame assembly and the second female hinge and the third female hinge are mounted along the pivot axis of the access door; a male hinge comprising a mounting block having a top end and a bottom end and a pivot rod extending out of the top end of the mounting block, wherein the male hinge is mounted within the third side of the door frame assembly; and a hinge pin, wherein the access door is mounted within the frame by aligning the third female hinge with the male hinge and aligning the first female hinge with the second female hinge and the placing the hinge pin through the openings of the first and second female hinges.

In yet another aspect, this invention includes a truck utility body comprising at least two parallel boxes connected by a floor, wherein each box comprises at least one storage compartment, each storage compartment having at least one access door and frame assembly, the access door and frame assembly further comprising a door frame assembly having a first side, a second side, a third side, and a fourth side, wherein the first side is positioned opposite the third side, the second side is connected to the first side and the third side, and the fourth side is positioned opposite the second side and connected to the first side and the third side; an access door having a pivot axis; a first female hinge, a second female hinge, and a third female hinge, each comprising a hollow mounting block having an opening at the top and bottom of the mounting block, wherein the first female hinge is mounted within the first side of the door frame assembly and the second female hinge and the third female hinge are mounted along the pivot axis of the access door; a male hinge comprising a mounting block having a top end and a bottom end and a pivot rod extending out of the top end of the mounting block, wherein the male hinge is mounted within the third side of the door frame assembly; and a hinge pin.

BRIEF DESCRIPTION OF THE FIGURES

FIG. 2 is a side view of a utility body.

FIG. 2A is an expanded view of arc A of FIG. 2.

FIG. 2B is an expanded view of arc B of FIG. 2.

DETAILED DESCRIPTION

The present invention concerns a hinge assembly for truck utility bodies. The hinge assembly is mounted inside the utility body of the truck, thereby eliminating the problems associated with externally mounted hinge assemblies.

Figure 1:
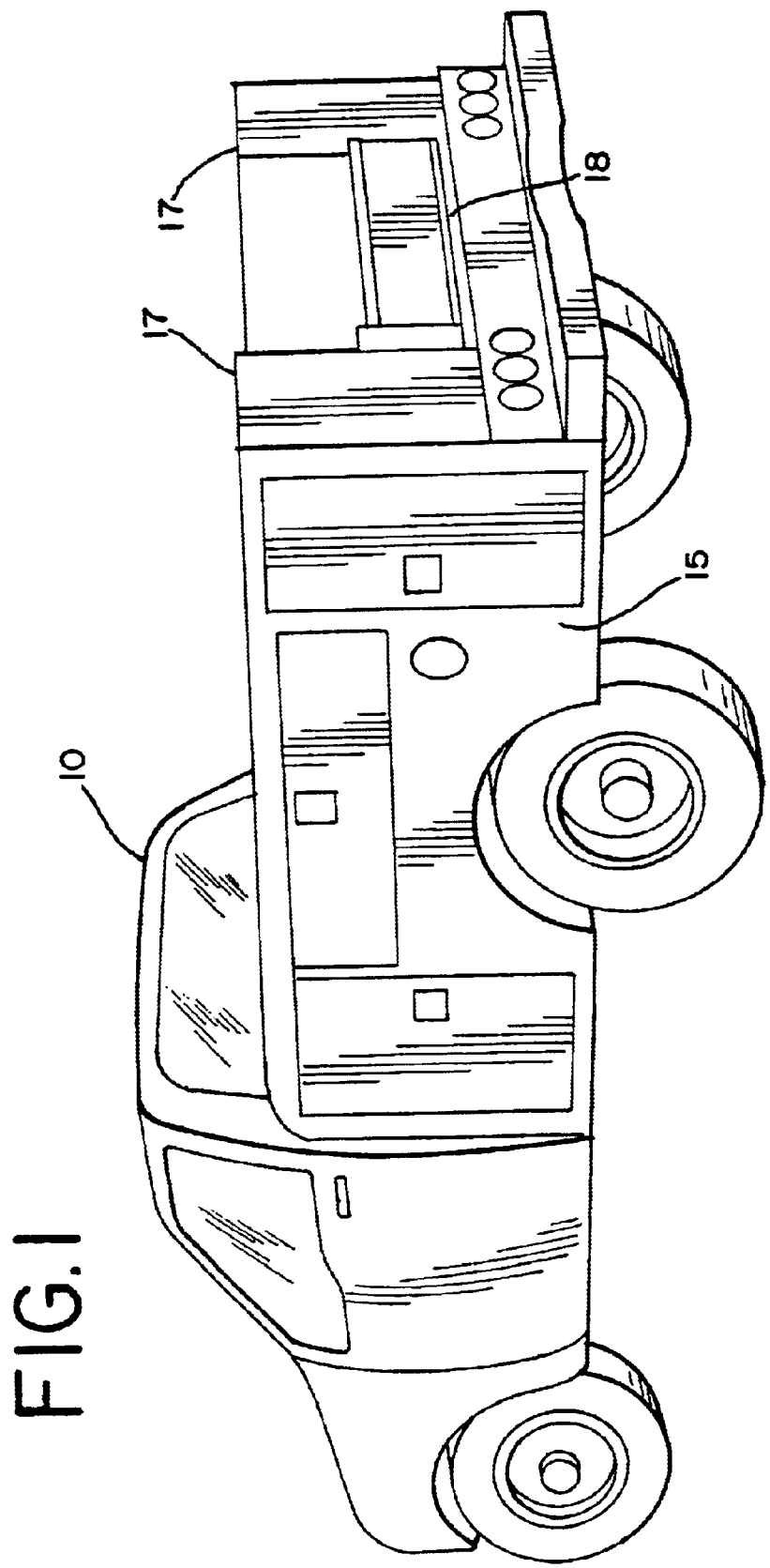
FIG. 1 illustrates a truck chassis with a utility body mounted to the chassis.

FIG. 1 illustrates a truck chassis 10 with a utility body 15 mounted to truck chassis 10. While utility body 15 depicted in FIG. 1 is typical of those used in construction vehicles, it should be understood by those of skill in the art that the present invention may be used on utility bodies incorporated in a variety of commercially operated vehicles, including construction vehicles, utilities vehicles, fire vehicles, delivery vehicles, wrecker vehicles, aerial vehicles and rescue vehicles.

Utility body 15 includes at least two parallel rows of boxes 17 running the length of truck chassis 10 and connected to each other by floor 18. Each box 17 is further divided into two or more separate storage compartments 20, as shown in FIG. 2. Each storage compartment 20 is accessible through at least one access opening 22, framed by a doorframe assembly 25 located within a side of box 17. Preferably, doorframe assembly 25 is positioned completely within box 17 such that no part of doorframe assembly 25 extends beyond the exterior of box 17. Typically, utility body 15 is made from Galva Neal coated steel or aluminum.

Doorframe assembly 25 is comprised of at least four sides: a first side 30, a second side 40, a third side 50, and a fourth side 60. First side 30 is positioned opposite third side 50. Second side 40 is connected to first side 30 and third side 50. Fourth side 60 is positioned opposite second side 40 and is connected to first side 30 and third side 50.

Figures 3, 3A:
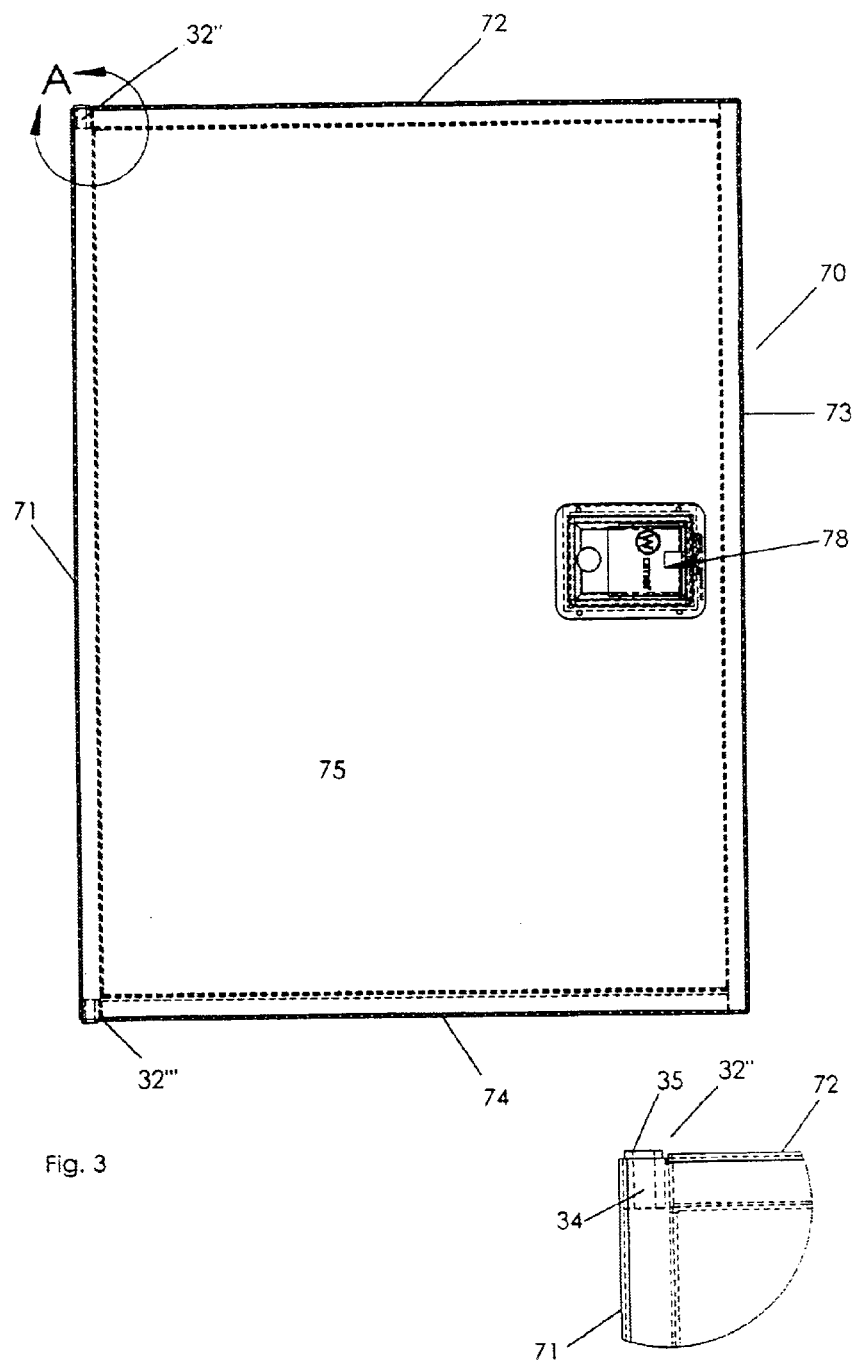
FIG. 3 is a front view of an access door.
FIG. 3A is an expanded view of arc A of FIG. 3.

An access door 70, shown in FIG. 3, is mounted within doorframe assembly 25 in order to conceal access opening 22. Typically, access door 70 is created from Galva Neal coated steel or aluminum. Preferably access door 70 is made from the same material as utility body 15. Access door 70 comprises a first surface 71, a second surface 72, a third surface 73, a fourth surface 74, a front face 75, and a back face. When access door 70 is mounted within doorframe assembly 25, first surface 71 is adjacent to first side 30 of doorframe 25, second surface 72 is adjacent to second side 40, third surface 73 is adjacent to third side 50, and fourth surface 74 is adjacent to fourth side 60.

Access door 70 has a pivot axis X—X upon which access door 70 will move from a closed to an open position within doorframe assembly 25. Preferably, access door 70 is mounted such that pivot axis X—X is adjacent and parallel to first side 30 of doorframe assembly 25. Access door 70 also has a latching mechanism 78 to maintain access door 70 in a closed position. Any latching mechanism 78 known to those skilled in the art may be used in the present invention. For example, but not limited to, 1-point, 2-point, or 3-point twisting T handle latches, 1-point, 2-point, or 3-point twisting D ring latches, slide bolt (slam) style latches or rotary latches may be used in the present invention. Preferably, the latching mechanism is one capable of being locked to prevent unauthorized opening of access door 70.

Figure 4:
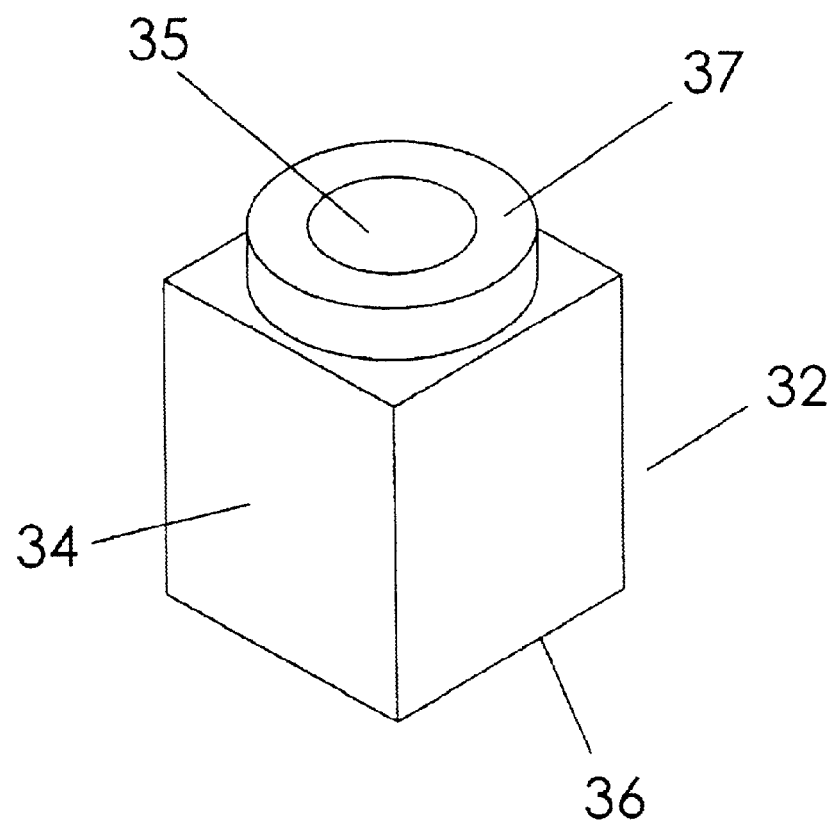
FIG. 4 is a pictorial view of a female hinge assembly.

Access door 70 is mounted within access opening 22 using a door hinge assembly of the present invention comprising three female hinges 32, a male hinge 52, and a hinge pin 80. It should be understood, however, that the door hinge assembly of the present invention may be comprised of fewer or more components, depending on manufacturing and consumer preferences. As shown in FIG. 4, each female hinge 32 comprises a hollow mounting block 34 having a top opening 35 and a bottom opening 36. However, in some situations, mounting block 34 may only have top opening 35 and not bottom opening 36 as well. Optionally, a hollow spacer 37 may be positioned atop mounting block 34 such that it encircles top opening 35 of mounting block 34. Hollow spacer 37 may be designed to be integral with mounting block 34 or may be a separate piece.

As shown in FIGS. 2 and 2A, the first female hinge 32' is mounted within second side 40 of doorframe assembly 25. Preferably, first female hinge 32' is mounted such that the top of mounting block 34 is flush with or extends only slightly through second side 40.

Second female hinge 32" and third female hinge 32''' are mounted within access door 70, along pivot axis X—X, as shown in FIG. 3. Preferably, second female hinge 32" is mounted within second surface 72 of access door 70 such that the top of mounting block 34 is flush with second surface 72. Likewise, it is preferably that third female hinge 32''' is mounted within fourth surface 74 of access door 70 such that the top of mounting block 34 is flush with fourth surface 74 of access door 70. If hollow spacer 37 is used with mounting block 34 of female hinge 32" or 32''', then, preferably, hollow spacer 37 will extend beyond second surface 72 and fourth surface 74, respectfully, of access door 70, as shown in FIGS. 3 and 3A.

Figure 5:
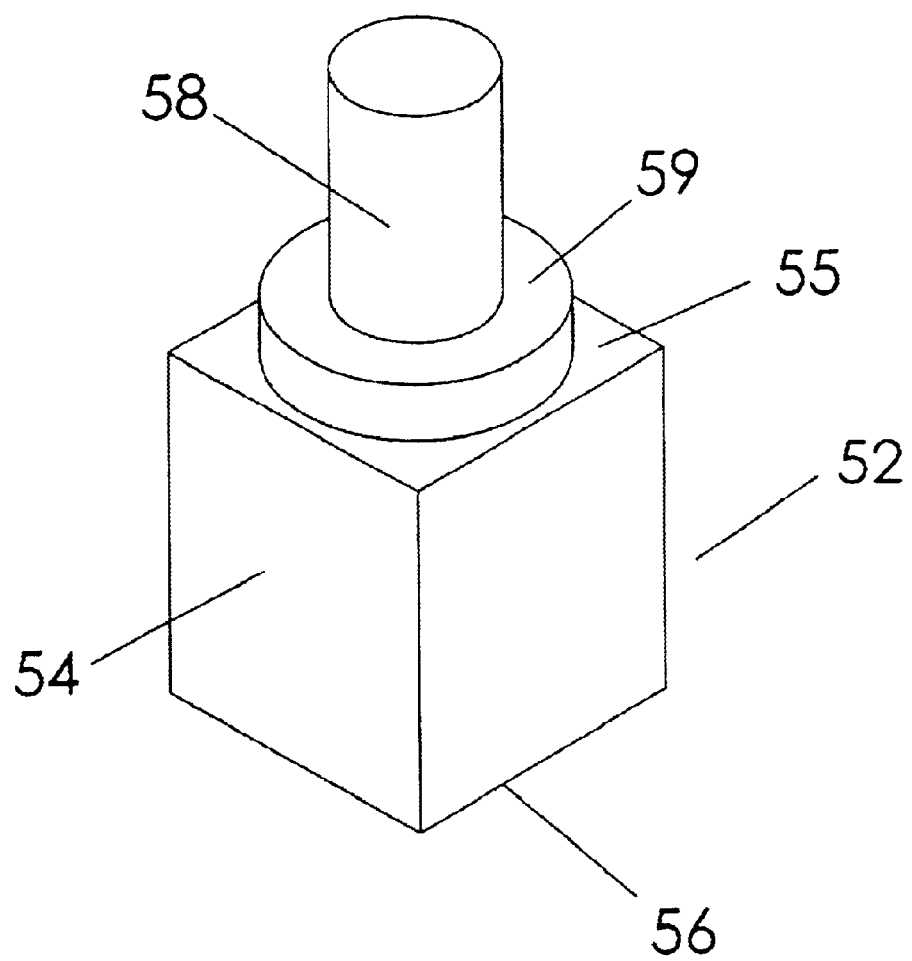
FIG. 5 is a pictorial view of a male hinge assembly.

Male hinge 52, shown in FIG. 5, comprises a mounting block 54 having a top surface 55 and a bottom surface 56 with a pivot rod 58 extending out of top surface 55 of mounting block 54. Pivot rod 58 may be integral with mounting block 54 and formed as a single piece. Alternatively, pivot rod 58 may be a separate piece that is inserted into mounting block 54 such that part of pivot rod 58 extends past top surface 55 of mounting block 54. In this alternative situation, hollow mounting block 34 may be used as mounting block 54 of male hinge 52 with pivot rod 58 inserted into top opening 35. Optionally, a spacer 59 may be positioned atop mounting block 54 with pivot rod 58 extending out of spacer 59. Spacer 59 may be designed to be integral with mounting block 34 or may be a separate piece. If spacer 59 is a separate piece, it must be designed to allow pivot rod 58 to extend through it.

As shown in FIG. 2B, male hinge 52 is mounted within fourth side 60 of doorframe assembly 25. Preferably, male hinge 52 is mounted such that top surface 55 of mounting block 54 is flush with fourth side 60 and pivot rod 58 extends into access opening 22. If spacer 59 is used with male hinge 52, preferably, spacer 59 extends beyond the surface of fourth side 60 and into access opening 22.

To mount access door 70 into access opening 22, male hinge 52 is aligned with third female hinge 32''' by inserting pivot rod 58 into top opening 35 of third female hinge 32'''. Then second female hinge 32" is aligned with first female hinge 32' such that top opening 35 of second female hinge 32" is aligned with top opening 35 of first female hinge 32'. Finally, hinge pin 80 is inserted through bottom opening 36 of first female hinge 32', through top opening 35 of first female hinge 32' and then through top opening 35 of second female hinge 32" in order to maintain alignment of first female hinge 32' and second female hinge 32".

In one embodiment, hinge pin 80 is an L-shaped rod having a short leg and a long leg, such that, when the long leg of hinge pin 80 is inserted through first female hinge 32' and second female hinge 32", the short leg prevents hinge pin 80 from falling through the female hinges and on into access door 70. However, one of skill in the art would understand that there are a variety of ways to design hinge pin 80 which allow it to maintain position within first female hinge 32' and second female hinge 32". Furthermore, if second female hinge 32" does not have bottom opening 36, then there is no risk of it falling out of position within second female hinge 32".

By removing hinge pin 80, which, preferably, requires minimal or no tools, access door 70 can be leaned outward and lifted off of male hinge 52. This makes the access door easy to mount, easy to remove and, therefore, easy to change.

Furthermore, because the hinge assembly of the present invention is mounted completely within doorframe assembly 25, no internal space is lost within storage compartment 20 when access door 70 is in a closed position. Additionally, since the hinge assembly is contained entirely within the utility truck body, it is not subject to the problems encountered by the externally mounted hinges used to date, such as theft, rust, and dirt invading the hinge assembly.

It should be understood that a wide range of changes and modifications can be made to the embodiments of the access door and hinge assembly described above. For example, one of skill in the art would understand that latching mechanism 78 may be located in a variety of positions on access door 70. It is therefore intended that the foregoing description illustrates rather than limits this invention, and that it is the following claims, including all equivalents, which define this invention.

I claim:

1. A door hinge assembly comprising
   (a) a door frame assembly having a first side, a second side, a third side, and a fourth side, wherein the first side is positioned opposite the third side, the second side is connected to the first side and the third side, and the fourth side is positioned opposite the second side and connected to the first side and the third side;
   (b) a first female hinge, a second female hinge, and a third female hinge, each comprising a hollow mounting block having an opening at the top and bottom of the mounting block;
   (c) a male hinge comprising a mounting block having a top end and a bottom end and a pivot rod extending out of the top end of the mounting block,
   (d) an access door having a pivot axis, and
   (e) a hinge pin,
   wherein the first female hinge is mounted within the second side of the door frame assembly, the second female hinge and third female hinge are mounted along the pivot axis of the access door, and the male hinge is mounted within the fourth side of the door frame assembly.

2. The door hinge assembly of claim 1 wherein the first female hinge mounted within the second side of the door frame is aligned with the second female hinge mounted along the pivot axis of the access door and the third female hinge mounted along the pivot axis of the access door is aligned with the male hinge mounted within the fourth side of the door frame.

3. The door hinge assembly of claim 2 wherein the hinge pin is inserted through the first female hinge and the second female hinge in order to maintain alignment of the first female hinge with the second female hinge.

4. The door hinge assembly of claim 2 wherein the pivot rod of the male hinge is inserted into the opening at the top of the mounting block of the third female hinge in order to maintain alignment of the male hinge and the third female hinge.

5. The door hinge assembly of claim 1, wherein a hollow spacer encircles the opening at the top of the mounting block of second female hinge.

6. The door hinge assembly of claim 5, wherein the hollow spacer is integral with the mounting block of the female hinge.

7. The door hinge assembly of claim 1, wherein the opening of female hinge is located only at the top of the mounting block.

8. The door hinge assembly of claim 1, wherein the male hinge has a spacer attached to the top end of the mounting block and the pivot rod extends out of the top end of the mounting block and the spacer.

9. The door hinge assembly of claim 8, wherein the spacer is integral with the mounting block.

10. The door hinge assembly of claim 1, wherein the hinge pin is L-shaped.

11. A access door and frame assembly, comprising
    (a) a door frame assembly having a first side, a second side, a third side, and a fourth side, wherein the first side is positioned opposite the third side, the second side is connected to the first side and the third side, and the fourth side is positioned opposite the second side and connected to the first side and the third side;
    (b) an access door having a pivot axis;
    (c) a first female hinge, a second female hinge, and a third female hinge, each comprising a hollow mounting block having an opening at the top and bottom of the mounting block, wherein the first female hinge is mounted within the second side of the door frame assembly and the second female hinge and the third female hinge are mounted along the pivot axis of the access door;
    (d) a male hinge comprising a mounting block having a top end and a bottom end and a pivot rod extending out of the top end of the mounting block, wherein the male hinge is mounted within the third side of the door frame assembly; and
    (e) a hinge pin,
    wherein the access door is mounted within the frame by aligning the third female hinge with the male hinge and aligning the first female hinge with the second female hinge and the placing the hinge pin through the openings of the first and second female hinges.

12. The access door and frame assembly of claim 11 wherein the door and frame are located within the side of a utility truck body.

13. The access door and frame assembly of claim 12 wherein the access door is flush with the side of the utility truck body.

14. The access door and frame assembly of claim 11 wherein the access door further comprising a latching mechanism.

15. The access door and frame assembly of claim 14 wherein the latching mechanism is capable locking the access door into a closed position.

16. The access door and frame assembly of claim 11 wherein the hinge pin is inserted through the first female hinge and the second female hinge in order to maintain alignment of the first female hinge with the second female hinge.

17. The access door and frame assembly of claim 11 wherein the pivot rod of the male hinge is inserted into the opening at the top of the mounting block of the third female hinge in order to maintain alignment of the male hinge and the third female hinge.

18. The access door and frame assembly of claim 11, wherein a hollow spacer encircles the opening at the top of the mounting block of the second female hinge.

19. The access door and frame assembly of claim 18, wherein the hollow spacer is integral with the mounting block of the female hinge.

20. The access door and frame assembly of claim 11, wherein the opening of second female hinge is located only at the top of the mounting block.

21. The access door and frame assembly of claim 11, wherein the male hinge has a spacer attached to the top end of the mounting block and the pivot rod extends out of the top end of the mounting block and the spacer.

22. The access door and frame assembly of claim 21, wherein the spacer is integral with the mounting block.

23. The access door and frame assembly of claim 11, wherein the hinge pin is L-shaped.

24. A truck utility body comprising
at least two parallel boxes connected by a floor, wherein each box comprises at least one storage compartment, each storage compartment having at least one access door and frame assembly, the access door and frame assembly further comprising
(a) a door frame assembly having a first side, a second side, a third side, and a fourth side, wherein the first side is positioned opposite the third side, the second side is connected to the first side and the third side, and the fourth side is positioned opposite the second side and connected to the first side and the third side;
(b) an access door having a pivot axis;
(c) a first female hinge, a second female hinge, and a third female hinge, each comprising a hollow mounting block having an opening at the top and bottom of the mounting block, wherein the first female hinge is mounted within the first side of the door frame assembly and the second female hinge and the third female hinge are mounted along the pivot axis of the access door;
(d) a male hinge comprising a mounting block having a top end and a bottom end and a pivot rod extending out of the top end of the mounting block, wherein the male hinge is mounted within the third side of the door frame assembly; and
(e) a hinge pin.

25. The utility body of claim 24, wherein the access door is mounted within the frame by aligning the third female hinge with the male hinge and aligning the first female hinge with the second female hinge and the placing the hinge pin through the openings of the first and second female hinges.

26. The utility body of claim 24 wherein the access door is flush with the side of the utility body.

* * * * *